United States Patent [19]

Peter et al.

[11] Patent Number: 5,368,383
[45] Date of Patent: Nov. 29, 1994

[54] APPARATUS FOR PRODUCING RUBBER MIXTURES

[75] Inventors: Julius Peter, Dommayergasse 7/13, A-1130 Wien, Austria; Günter Weckerle, Northeim, Germany

[73] Assignees: Julius Peter, Wien, Austria; Continental Aktiengesellschaft, Hanover, Germany

[21] Appl. No.: 198,080

[22] Filed: Feb. 15, 1994

Related U.S. Application Data

[63] Continuation of Ser. No. 919,217, Jul. 24, 1992, abandoned.

[30] Foreign Application Priority Data

Sep. 2, 1991 [DE] Germany .................... 4129108

[51] Int. Cl.⁵ .............................................. B29B 7/06
[52] U.S. Cl. ........................................ 366/97; 366/91; 366/301
[58] Field of Search ................ 366/83, 297, 84, 85, 366/86, 69, 71, 72, 73, 74, 322, 147, 301, 300, 312, 91, 97; 100/145, 146; 241/293, 300; 425/201, 204, 208, 209; 492/30, 34, 35

[56] References Cited

U.S. PATENT DOCUMENTS

| | | |
|---|---|---|
| 1,623,159 | 4/1927 | Bowen et al. ............... 366/322 |
| 2,781,563 | 2/1957 | North ......................... 366/27 |
| 3,069,873 | 12/1962 | Whitlock ................... 100/145 |
| 3,375,549 | 4/1968 | Geyer ........................ 366/83 |
| 3,469,824 | 9/1969 | Futty et al. ................ 366/64 |
| 3,529,541 | 9/1970 | Ward ........................ 100/145 |
| 3,592,128 | 7/1971 | French ..................... 100/145 |
| 3,672,644 | 6/1972 | Crixell ...................... 425/201 |
| 3,804,382 | 4/1974 | Pultz ........................ 366/79 |
| 4,036,540 | 7/1977 | Suefert ..................... 366/83 |
| 4,215,942 | 8/1980 | Seufert et al. ............ 366/81 |
| 4,234,259 | 11/1980 | Wiedmann et al. ...... 366/301 |
| 4,604,781 | 8/1986 | Rankin, III ............... 241/293 |
| 4,848,683 | 7/1989 | Kawatsu ................... 241/300 |
| 4,889,430 | 12/1989 | Mueller .................... 425/204 |
| 4,910,237 | 3/1990 | Peter . | |
| 4,996,919 | 3/1991 | Mansfield ................. 100/145 |
| 5,011,291 | 4/1991 | Peter . | |
| 5,108,188 | 4/1992 | Peter et al. . | |

FOREIGN PATENT DOCUMENTS

| | | | |
|---|---|---|---|
| 2072028 | 9/1981 | United Kingdom ........ 366/69 |
| 2195553 | 4/1988 | United Kingdom ........ 366/70 |

*Primary Examiner*—David A. Scherbel
*Assistant Examiner*—Tony G. Soohoo
*Attorney, Agent, or Firm*—Robert W. Becker & Associates

[57] ABSTRACT

An apparatus for producing rubber mixtures, including a ram kneader for the master batch, and disposed therebelow a ram-less kneader that operates in a batch process and to which the master batch is supplied without intermediate storage thereof. To rapidly cool the master batch in the ram-less kneader and to be able to reliably and rapidly carry out the finish mixing process, only a portion of the active surface of the rotor of the ram-less kneader is provided with a surface wear protection layer. This layer is preferably provided only in the region of the active edges of the raised portions of the rotor, while the remaining portion of the active surface is free of such a wear protection layer.

14 Claims, 2 Drawing Sheets

APPARATUS FOR PRODUCING RUBBER MIXTURES

This application is a continuation division, of application Ser. No. 07/919,217 filed Jul. 24, 1992 now abandoned.

BACKGROUND OF THE INVENTION

The present invention relates to an apparatus for producing rubber mixtures, including a ram kneader that operates in a batch process for producing a master batch. Disposed below the ram kneader is a ram-less kneader that also operates in a batch process, is designed for admixing reactive additives, and serves for producing the final mixture and for cooling the mixture. The master batch is transferable from the ram kneader to the ram-less kneader without intermediate storage thereof. A surface wear protection layer is provided for the active, inwardly disposed kneader surfaces that come into contact with the rubber mixture, and cooling means are provided for the rotors and the casings of the two kneaders that accommodate the same.

In order to prevent premature wear of the aforementioned active surfaces, and in particular of the rotor surfaces, these surfaces are provided with a surface wear protection layer that contains cobalt, tungsten, chromium and carbon, with these materials being used in combination with one another, for example as STELLITE. With today's technology, these special layers are generally indispensible; they are used for both the master batcher and the final mixer.

However, peculiarities arise with the aforementioned apparatus, because the mixture that is obtained directly from the master batcher without intermediate storage must be rapidly and adequately cooled and final mixed in the ram-less kneader.

Furthermore, the present invention proceeds from the recognition that in the final mixer, of particular significance to the aforementioned ram-less kneader is the speed at which the empty kneader cools, and the cooling effect during the final mixing process. The cooling speed of a just-emptied kneader is important because the cooler that the kneader is, the more rapidly can the master batch be cooled. The cooling effect during the mixing process is important, because with a good cooling, the reactive additives can be more aggressively mixed and hence more reliably blended.

It is therefore an object of the present invention to improve an apparatus of the aforementioned general type in such a way that the master batch that is obtained is rapidly cooled, and the final mixing process can be rapidly and reliably carried out without having to worry that the mixture will, for example, start to react or vulcanize.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
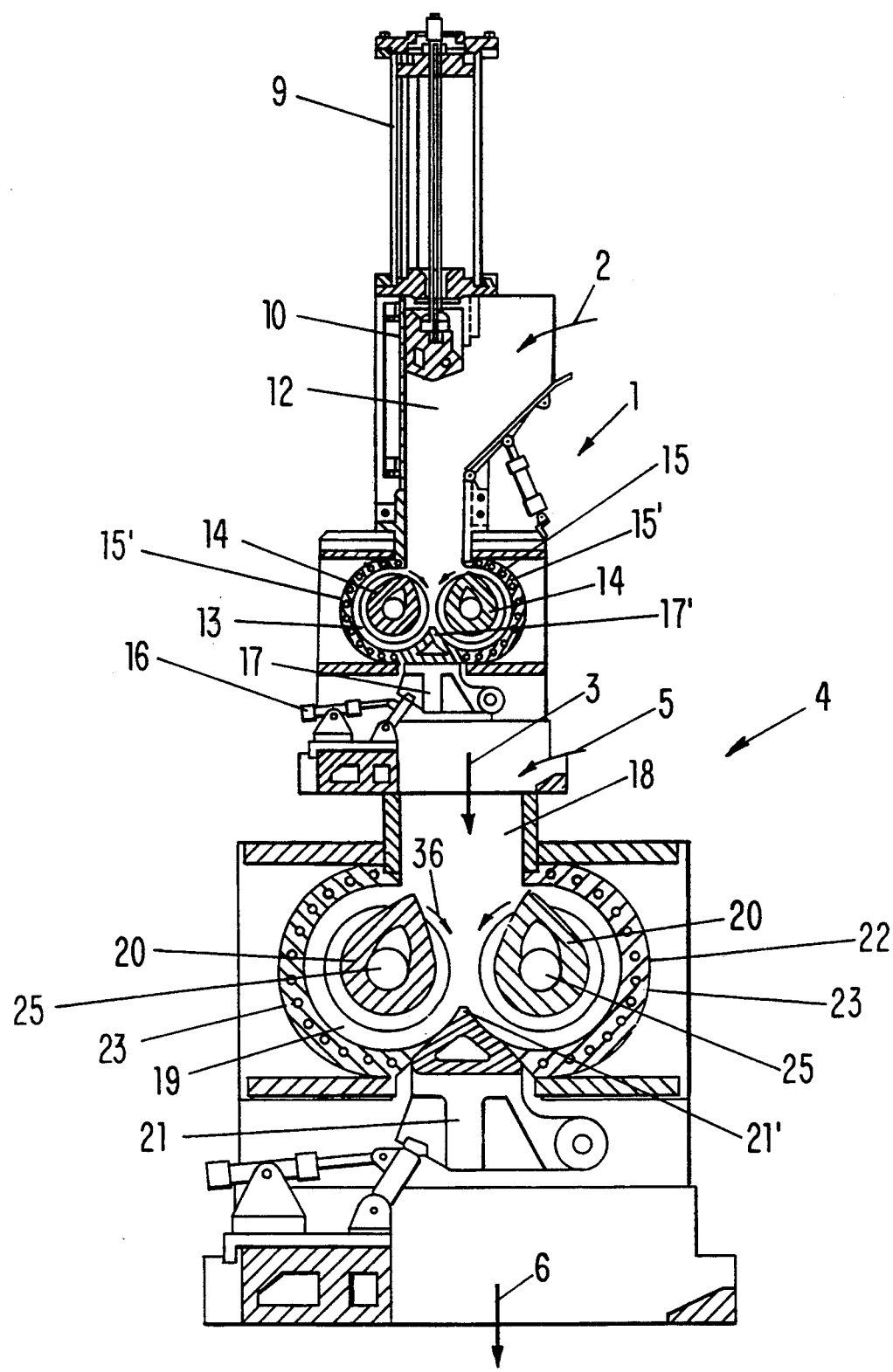
FIG. 1 is a vertical cross-sectional view through one exemplary embodiment of the inventive apparatus for producing rubber mixtures.
Figure 2:
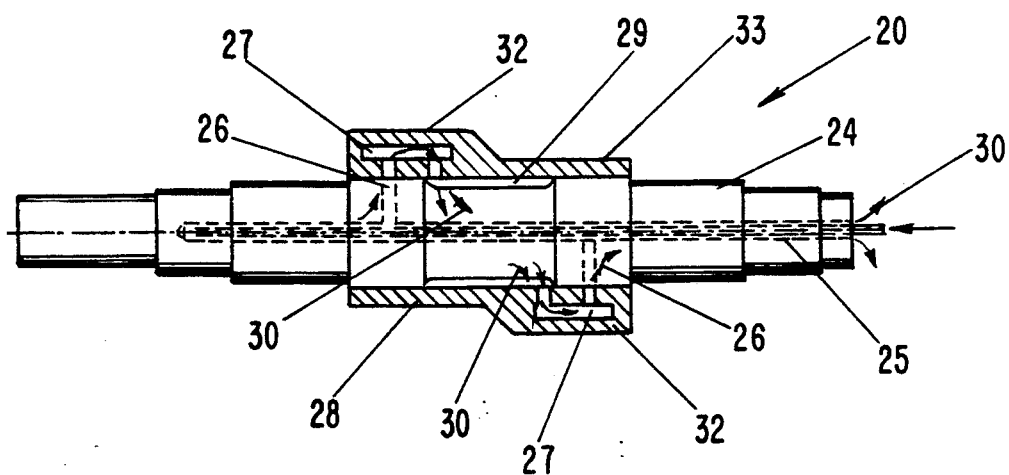
FIG. 2 is a partially cross-sectioned view through a rotor shaft and rotor for the ram-less kneader that is provided for producing the final mixture.
Figure 3:
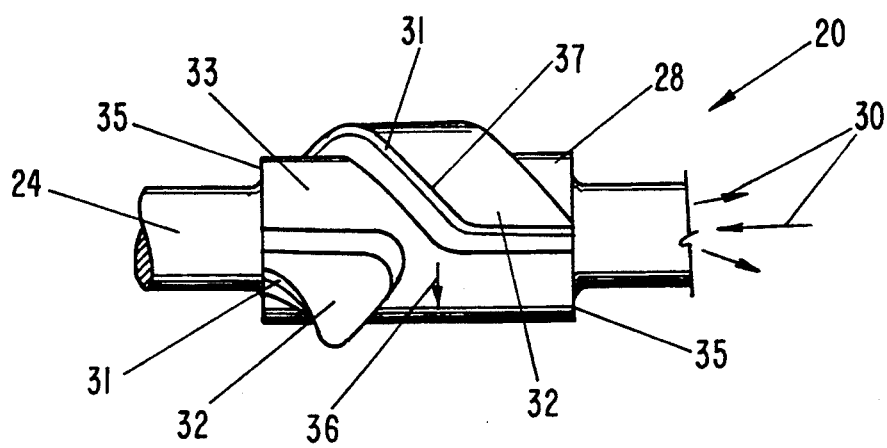
FIG. 3 is a plan view of the rotor of FIG. 2.

The apparatus of the present invention is characterized primarily in that at least a portion, preferably however the greatest portion, of the active surface of the rotor of the kneader that serves for producing the final mixture has no surface wear protection layer, whereas the remaining portion of the active surface is provided with the conventional surface treatment for wear protection. In addition, the master batcher has the conventional surface wear protection. Expediently, however, with the final mixer particular care is taken of those surface portions that are particularly subjected to wear, and accordingly the leading (as viewed in the direction of operation of the rotor) edge regions of the raised portions of the rotor are provided with the surface protection while the remaining surfaces of the raised portions as well as the surfaces on the bases between the raised portions are kept free of the aforementioned wear protection.

With this proposal, the object of the present invention is surprisingly realized, because hot, plasticized mixture is supplied to the kneader for the final mixing, and only the reactive, non-abrasive materials have to be processed and distributed, whereby precisely for this purpose the aforementioned wear protection features are entirely adequate, especially since the ram-less kneader operates at slow speeds. However, of even greater significance is the fact that the kneader exhibits a vastly improved cooling characteristic. The cooling effect is important because the aforementioned wear protection coating can no longer act as a kind of insulating layer. Thus, the speed at which the emptied kneader cools also increases many times over. For these reasons, the inventive apparatus can even be used for such mixtures that would otherwise have to react due to their scorch setting. This effect can probably be attributed to the fact that due to the good cooling effect, the reactive materials are predominantly incorporated into already cooled mixture layers, and due to the poor thermal conductivity of the rubber, are protected from a subsequent, detrimental reheating.

Further specific features of the present invention will described in detail subsequently.

DESCRIPTION OF PREFERRED EMBODIMENTS

Referring now to the drawing in detail, disposed at the top of the apparatus is a ram kneader 1 for producing the master batch; the inactive additives are conveyed to the mixture in the direction of the arrow 2. The finished master batch is withdrawn in the direction of the arrow 3 and, without intermediate storage, is conveyed in batches directly to the final mixer 4, which also operates in a batch process. The mixture cools off in the final mixer 4, where it is also provided with the reactive materials in the direction of the arrow 5. The final mixture leaves the apparatus in a conventional manner in the direction of the arrow 6 for delivery to a roller mechanism, application screw conveyor, etc.

The ram kneader 1 is provided with a working cylinder 9 to actuate the press or ram 10, which is moved through the hopper 12.

The mixing chamber 13 is provided with two rotors 14 that are disposed within the two casing parts 15. A working cylinder 16 serves to operate the hinged closure means 17, with its saddle 17', that is disposed at the bottom of the ram kneader.

The mixing chamber 13 is delimited by active surfaces, namely the outer surfaces of the rotors 14 and the inner surfaces of the casing parts 15. These active surfaces are provided in a conventional manner with a surface wear coating or layer containing chromium, tungsten, cobalt and carbon, and having a thickness measured in millimeters. For example, such a coating can be applied by a welding process, in particular with an automatic welding machine utilizing powder. The coating that is applied by such a welding process is left in the state in which it is produced by the welding. Machining is required only if minimum play between the rotor and the casing wall is not achieved. During the welding process itself, beads of material are disposed adjacent to one another in such a way that the furrows between adjacent beads are not too deep. This makes it possible to polish the applied coating in order thereby to produce a coating that is as smooth as possible. The material that is to be applied by welding can be any very hard metal or alloy that is resistant to wear and abrasion. An example of such a material is STELLITE. The important thing is that the material that is applied by such a welding process intimately bonds with the structure of the basic rotor material. In addition, the ram kneader 1 is provided with the usual channel cooling for a fluid coolant, and in particular for the rotors 14 via the rotor shaft, and for the two casing parts 15 via the cooling channels 15'.

The final mixer 4 has an inlet 18 that opens out into the mixing chamber 19, which is provided with rotors 20 that move in opposite directions. Provided toward the bottom is a closure means 21 having a saddle 21'. On the whole, the final mixer 4 has a greater capacity than does the master batcher or ram kneader 1. In addition, the final mixer 4 is operated at a comparatively slower speed. The final mixer 4 furthermore has no ram, and is generally operated in an open condition.

The two casing parts 22 of the final mixer 4 are provided with cooling channels 23, the interior of which has a chrome plating that is a good heat conductor yet prevents the mixture from adhering to the walls.

Cooling of the two rotors 20 is effected from within via two axial channels 25 that are disposed concentric to the rotor shaft 24. Proceeding from the axial channels 25 are radial channels 26 that open out into hollow chamber 27 of the rotor casing 28 and additionally feed an annular space 29 between the rotor shaft 24 and the rotor casing 28. Cooling water is supplied and withdrawn in the direction of the arrows 30.

The important thing is that the active outer surface of the two intermeshing rotors 20 be provided merely in the radially outwardly disposed edge region 31 at the leading side of the raised portions 32, as viewed in the turning and operating direction of the rotors 20, relative to the surface 33 of the rotor casing 28, with a surface wear protection (indicated by x's) that contains chromium/carbon/cobalt/tungsten, or a similar protective and wear layer or coating, with the thickness thereof being measured in millimeters. Such a coating is provided in the manner previously discussed.

Thus, the greatest portion or majority of the active outer surface of the two rotors 20 is not reinforced or protected. As a consequence, the poor thermal conductivity of the aforementioned wear coatings has no influence. Rather, the surface wear protection coating is limited to the actually necessary regions and therefore still fulfills its task of reducing wear in the vicinity of the active rotor edges. However, in those regions not covered by the protective coating, a considerably increased cooling effect results for the mixture that passes out of the ram kneader 1 directly into the final mixer 4. For this reason, highly sensitive mixtures having a corresponding scorch setting can also be reliably processed. However, if these mixtures have left the mixing chamber 19, the latter cools off considerably more rapidly than do conventional mixing chambers that are provided with a protective coating for the rotors and the casing parts.

It is should also be noted that the end faces 35 of the rotor casing 28 can be provided with a wear protection coating since these end faces are not part of the actually active surfaces of the rotors 20 that inherently come into contact with the mixture.

It should also be noted that the direction of rotation of the rotors 20 is indicated by the arrows 36. Prominently shown are the leading (as viewed in the direction of rotation) edge regions 31 that are practically disposed only on those surfaces of the raised portions 32 that extend from the edges 37 to the surface 33 of the rotor casing 28.

The surface wear protection layer is preferably STELLITE, and in particular type 1.

The present invention is, of course, in no way restricted to the specific disclosure of the specification and drawing, but also encompasses any modifications within the scope of the appended claims.

What we claim is:

1. An apparatus for producing rubber mixtures, including:
   for producing a master batch, a ram kneader that operates in a batch process;
   a ram-less kneader that is disposed below said ram kneader, also operates in a batch process, is designed for admixing reactive additives, and serves for receiving said master batch from said ram kneader without intermediate storage of said master batch, and also serves for producing a final mixture and for cooling same, with said ram-less kneader including casing parts and cooling means therefor; and wherein the improvement comprises:
   rotors disposed in said casing parts of said ram-less kneader, with said rotors having active surfaces that come into contact with rubber mixture, with the greatest portion of said active surfaces being free of an integral surface wear protection coating while the remainder of said active surfaces is provided with such an integral coating.

2. An apparatus according to claim 1, wherein said rotors are provided with raised portions, with only a portion of said raised portions being provided with an integral surface wear protection coating.

3. An apparatus according to claim 2, wherein said raised portions have radially outwardly disposed edges and it is only the region of those radially outwardly disposed edges of said raised portions that is provided with a surface wear protection coating.

4. An apparatus according to claim 3, wherein leading edge of regions of said raised portions, as viewed in a direction of rotation of said rotors, are provided with an integral surface wear protection coating.

5. An apparatus according to claim 4, wherein said surface wear protection coating is disposed only on surfaces of said raised portions that extend from said radially outwardly disposed edges thereof toward a base surface of said rotors.

6. An apparatus according to claim 1, wherein said casing parts of said ram-less kneader have inner surfaces that are chrome-plated.

7. An apparatus according to claim 1, wherein said rotors of said ram-less kneader intermesh with one another.

8. An apparatus according to claim 1, wherein said casing parts of said ram-less kneader have inner surfaces with no integral surface wear protection.

9. An apparatus according to claim 1, wherein said rotors have end faces that are provided with an integral surface wear protection coating.

10. An apparatus according to claim 1, wherein said ram kneader is provided with rotors, and active surfaces of said rotors thereof are provided with an integral surface wear protection coating.

11. An apparatus according to claim 1, wherein said ram kneader is provided with rotors, said ram-less kneader has a greater capacity than does said ram kneader, and said rotors of said ram-less kneader operate at a slower speed than do said rotors of said ram kneader.

12. An apparatus according to claim 1, wherein said casing parts of said ram-less kneader have active inwardly facing surfaces that are partially provided with a surface wear protection coating.

13. An apparatus for producing rubber mixtures, including:
    for producing a master batch, a ram kneader that operates in a batch process, with said ram kneader being provided with rotors having active surfaces that come into contact with rubber mixture, said active surfaces being provided with an integral surface wear protection coating;
    a ram-less kneader that is disposed below said ram kneader, also operates in a batch process, is designed for admixing reactive additives, and serves for receiving said master batch from said ram kneader without intermediate storage of said master batch, and also serves for producing a final mixture and for cooling same, with said ram-less kneader including casing parts and cooling means therefor; and wherein the improvement comprises:
    rotors disposed in said casing parts of said ram-less kneader, with said rotors having active surfaces that come into contact with rubber mixture, wherein a portion only of said active surfaces of said rotors is provided with an integral surface wear protection coating.

14. An apparatus according to claim 13 wherein the greatest portion of said active surfaces is free of an integral surface wear protection layer.

* * * * *